Sept. 29, 1931.  A. GNAEGY  1,825,394
CONVERTIBLE TRACTOR WHEEL
Filed Sept. 9, 1930   2 Sheets-Sheet 2
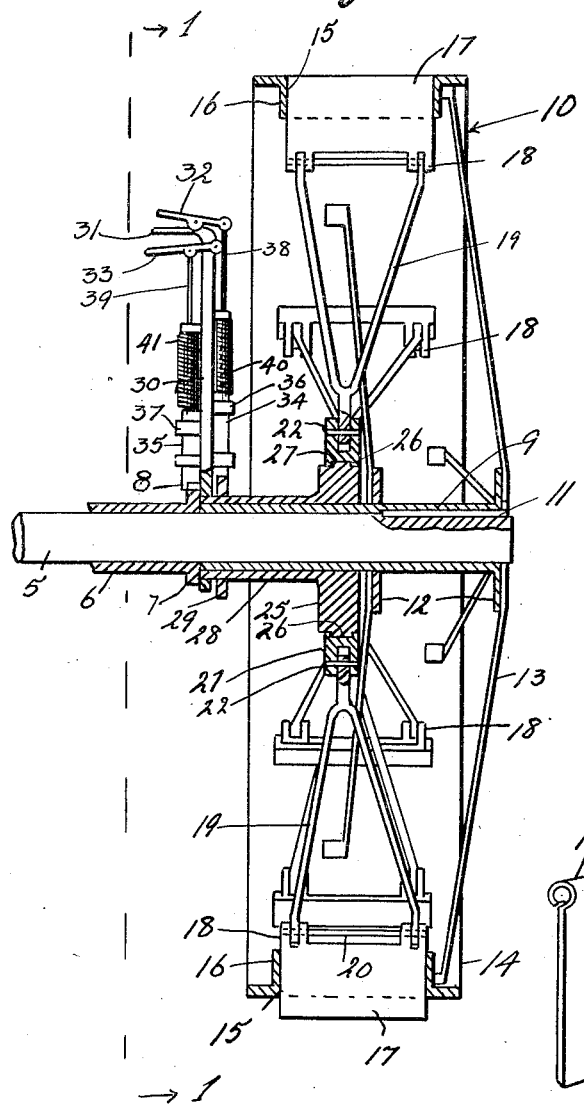
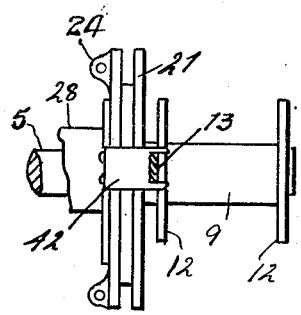
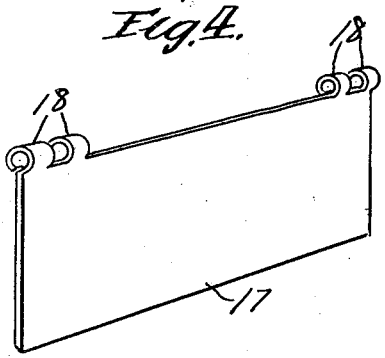
INVENTOR
Albert Gnaegy
By W. W. Williamson
Atty.

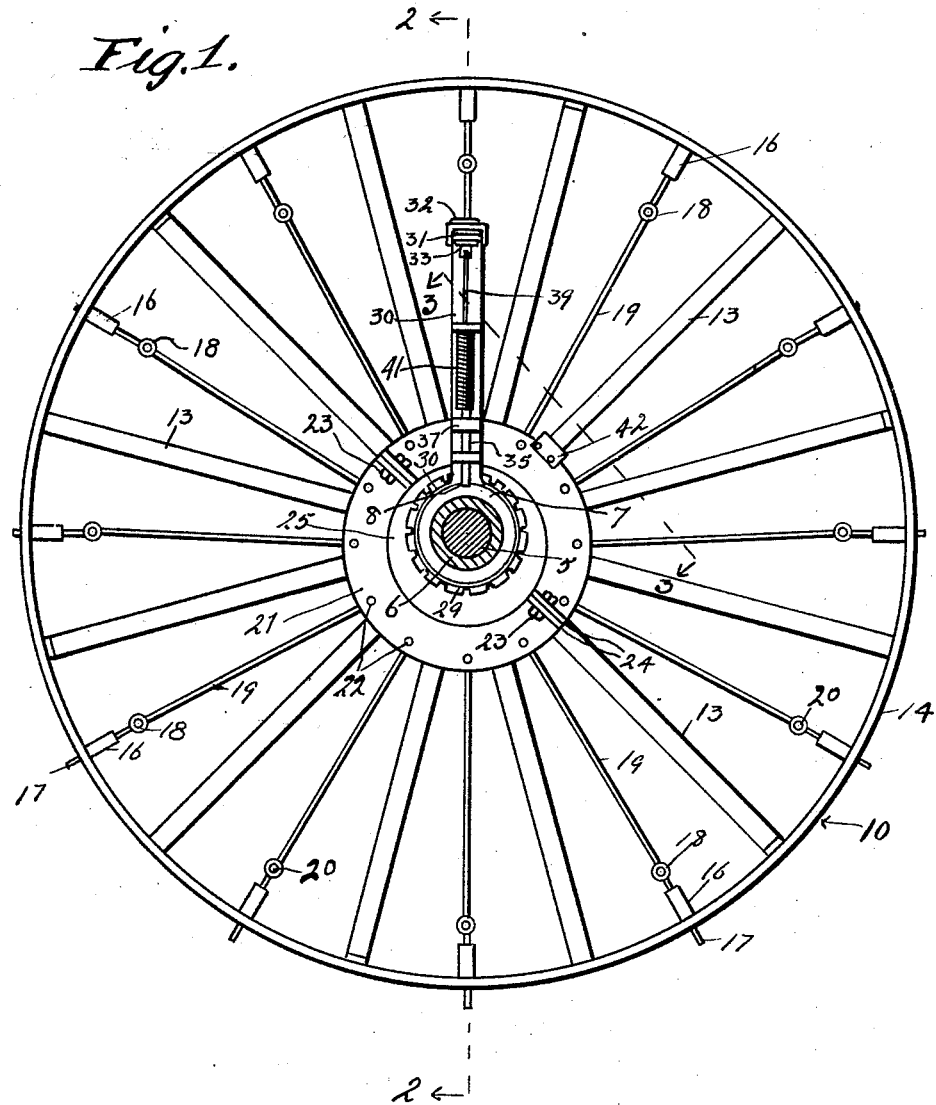

Patented Sept. 29, 1931

1,825,394

UNITED STATES PATENT OFFICE

ALBERT GNAEGY, OF CHESTER, ILLINOIS

CONVERTIBLE TRACTOR WHEEL

Application filed September 9, 1930. Serial No. 480,637.

My invention relates to new and useful improvements in a convertible tractor wheel, and has for one of its objects to provide an exceedingly simple, effective and unique device of this character which can be converted into a rough shod cleated wheel for farm, field and kindred work, or can be changed into a smooth rim wheel for running over hard surfaced or other roads or other surfaces which it is desirable not to mar or damage.

Another object of the invention is to provide a convertible tractor wheel having an apertured rim or apertures surrounded by inwardly projecting wall bearings in which cleats are slidably mounted, the latter being connected by arms which in turn are connected with a yoke or eccentric straps surrounding an eccentric which is rotatably mounted upon the hub of a wheel, said eccentric being provided with a sleeve which carries a notched disc for the reception of a spring actuated latch mounted upon a suitable operating lever which also carries another spring actuated latch for coaction with a notched keeper supported or carried by some suitable stationary element, such as the housing of the axle.

A further object of my invention is to construct the yoke or eccentric strap of two pieces and provide a tongue and groove connection between it and the eccentric to prevent any possibility of endwise movement relative to each other.

A still further object of the invention is to provide unique means for connecting the eccentric strap or yoke with one of the spokes of the wheel.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1 is an inner end view of a convertible tractor wheel constructed in accordance with my invention or a section on the line 1—1 of Fig. 2.

Fig. 2 is a section on the line 2—2 of Fig. 1 with a portion of the axle and the spring actuated latches and a part of the operating lever being left in elevation.

Fig. 3 is a fragmentary sectional view on the line 3—3 of Fig. 1, showing only the hub and one of the spokes of the wheel, and the eccentric strap or yoke and parts associated therewith.

Fig. 4 is an enlarged perspective view of one of the cleats.

In carrying out my invention as herein embodied, 5 represents an axle enclosed in a housing 6 which is stationary and which carries, supports or is provided with a keeper 7, in the form of a flange having a notch 8 preferably in the vertical center and preferably located above the axle as shown in Figs. 1 and 2. To the axle is keyed the hub 9 of the tractor wheel represented as a whole by the numeral 10, said key being designated by the numeral 11. The wheel hub is provided with hub flanges 12 to which are fastened the inner ends of the spokes 13, the outer ends of the latter being suitably connected with the wheel rim 14.

The rim of the wheel has a plurality of suitably spaced apertures 15 disposed thereabout and each of these is surrounded by walled guides 16 projecting inwardly from the inner surface of the rim. In the walled guides are slidably mounted cleats 17 in the form of plates or panels of any desirable length and suitable width or height so as to be projected beyond the outer surface of the wheel rim under some conditions, as will be presently described. The inner edge of each cleat is provided with ears 18 preferably arranged in pairs with one pair at each end of the cleat and in these are pivotally mounted the outer ends of the Y-shaped arms 19 by pintles 20. The other or inner ends of the arms are pivotally connected between the flanges of the eccentric strap or yoke 21 by means of pins 22.

The eccentric strap or yoke is made of two similar sections or semi-circles and when in place are secured together by suitable fastening means 23, such as bolts and nuts passing through contiguous lugs 24 projecting from the faces of said eccentric strap sections. The eccentric strap or yoke surrounds the eccentric 25 and one of these, as the eccentric, is provided with a peripheral tongue 26 while the other, as the eccentric strap or yoke, is provided with a groove 27 for registration with the tongue. It will be obvious that the arrangement just described can be reversed, the main object being to provide means which will prevent endwise movement of the eccentric and yoke relative to each other. The eccentric 25 is rotatably mounted upon the hub 9 of the tractor wheel and is provided with an inwardly projecting sleeve 28 and adjacent the inner end of said sleeve is a notched disc 29, said notched disc 29 being fixed to or formed as an integral part of the sleeve so that said disc, the sleeve 28 and the eccentric are as one and can be rotated together. This arrangement spaces the notched disc from the keeper 7 a sufficient distance for the passage and proper working of the operating lever 30 between the notched disc and the keeper, and said operating lever is suitably journalled preferably on the end of the sleeve 28 which projects beyond the notched disc 29, as plainly shown in Fig. 2. It might be well to state at this time, although it is really believed to be obvious, that any suitable antifriction bearings may be placed in any desirable manner with relation to the movable parts.

The outer end of the operating lever may be provided with a handle portion 31 adjacent which are pivoted the hand holds 32 and 33 whereby the latches 34 and 35 may be actuated in one direction for disengaging them from the notched disc 29 and the keeper 7 respectively, said latches being slidably mounted in suitable latch guides 36 and 37 carried by opposite faces of the operating lever 30 which latches having connecting rods 38 and 39 attached thereto and suitably connected with the hand holds. As before intimated, the latches are spring actuated in one direction by means of springs 40 and 41 for normally holding them in engagement with or moving them toward their respective elements with which they coact, namely, the notched disc 29 and the keeper 7.

In order that the eccentric strap or yoke 21 shall positively revolve with the wheel and therefore have no lost motion between the said eccentric strap or yoke, the arms and the cleats, I provide a clip 42 which is fastened to the eccentric strap or yoke and has a bifurcated end which straddles one of the spokes 13 of the wheel.

As shown in Figs. 1 and 2 when the high part of the eccentric is positioned below the axle, the cleats 17 at the bottom of the wheel project beyond the outer face of the rim, whereas the cleats at the top of said wheel either lie flush with the outer surface of the rim or are retracted a sufficient distance to be inside of said outer surface of the rim. When the parts are functioning as thus indicated, the tractor wheel may be used for farm or field work or any place where a rough shod wheel is desirable or necessary.

By reversing the position of the high part of the eccentric so that said high part is above the axle, then the cleats 17 at the bottom of the wheel will be retracted and the wheel will present a smooth face to the surface over which it is traveling which is particularly adapted for hard surfaced roads or any other surface where it is undesirable to use cleats.

To convert the wheel from a rough shod or cleated one to a plain wheel or vice versa, the latch 35 is disengaged from the keeper 7, thereby releasing the operating lever 30 so that it may be rotated and the rotation thereof, with the latch 34 in engagement with the notched disc 29, will rotate said notched disc, the sleeve 28 and the eccentric 25. As soon as said eccentric is properly positioned, the latch 34 is disengaged from its notched disc and the operating lever 30 is returned to its normal position or approximately so and the latch 34 then allowed to enter a notch in the disc 29 lying adjacent the notch in the keeper 7, but if not properly aligned so that the latch 35 can enter the notch in the keeper, then after the latch 34 has entered a notch in the disc 29, the operating lever can thereafter be moved until the latch 35 will engage the notch in the keeper thereby locking the eccentric in the desired position.

While I have described the operation in terms that would indicate that the operating lever is moved a one-half turn for making the adjustment, it will be obvious that said operating lever may be moved but a very short distance if desired and the latch 34 then disengaged from the notched disc and the operating lever moved back until said latch 34 can enter another notch and a further movement made and such operations may be continued until the eccentric is properly positioned. In other words, the eccentric may be moved from one position to another step by step.

Of course I do not wish to be limited to the exact details of construction as herein shown, as these may be varied within the limits of the appended claims without departing from the spirit of my invention.

Having thus fully described my invention, what I claim as new and useful is:—

1. A convertible tractor wheel comprising a hub, an apertured rim, and spokes connecting said hub and rim, an axle on which the wheel is mounted, a housing for a portion of said axle, a keeper carried by said housing and having a fixed position, an eccentric rotatably mounted on the hub of the wheel, a sleeve connected with said eccentric, a notched disc mounted on said sleeve and having a fixed position adjacent the end of said sleeve, an operating lever journalled on said sleeve, a pair of latches carried by the operating lever and spring operated in one direction so as to normally engage the keeper and notched disc respectively, means whereby said latches may be disengaged from their respective co-operating members by manual operation, an eccentric strap or yoke surrounding the eccentric, cleats slidably mounted for projection through the apertures in the wheel rim, and means connected to said cleats and the eccentric strap or yoke whereby rotation of the latter about the eccentric will cause the cleats to move in and out.

2. In a convertible tractor wheel, an axle, a housing surrounding a portion of said axle, a keeper carried by said housing and having a fixed position, a wheel keyed to said axle, said wheel comprising a hub, an apertured rim, and spokes connected with the hub and rim, walled guides surrounding the apertures in the rim and projecting from the inner surface of said rim, cleats slidably mounted in said guides, a sleeve rotatably mounted on the hub, a notched disc at one end of said sleeve, an eccentric at the other end of said sleeve, said notched disc, sleeve and eccentric being rotatable together, an annular tongue on the periphery of said eccentric, a two-pieced internally grooved yoke mounted on the eccentric, arms having their inner ends pivotally connected with the yoke and having their outer ends pivotally connected with the cleats, an operating lever rotatably journalled between the notched disc and the keeper, a pair of spring latches mounted on opposite faces of the operating lever so that one coacts with the keeper and the other with the notched disc and independent means for actuating said spring latches to selectively disengage either one from the respective member with which it co-operates.

In testimony whereof, I have hereunto affixed my signature.

ALBERT GNAEGY.